United States Patent
Otsuki et al.

(10) Patent No.: US 12,325,639 B2
(45) Date of Patent: Jun. 10, 2025

(54) COLLOIDAL SILICA AND PRODUCTION METHOD THEREFOR

(71) Applicant: FUSO CHEMICAL CO., LTD., Osaka (JP)

(72) Inventors: Hideki Otsuki, Fukuchiyama (JP); Yoshiki Michiwaki, Fukuchiyama (JP); Yuma Negishi, Fukuchiyama (JP); Toshiki Chiba, Fukuchiyama (JP)

(73) Assignee: FUSO CHEMICAL CO., LTD., Osaka (JP)

( * ) Notice: Subject to any disclaimer, the term of this patent is extended or adjusted under 35 U.S.C. 154(b) by 770 days.

(21) Appl. No.: 17/436,335

(22) PCT Filed: Feb. 26, 2020

(86) PCT No.: PCT/JP2020/007574
§ 371 (c)(1),
(2) Date: Sep. 3, 2021

(87) PCT Pub. No.: WO2020/179555
PCT Pub. Date: Sep. 10, 2020

(65) Prior Publication Data
US 2022/0177318 A1 Jun. 9, 2022

(30) Foreign Application Priority Data
Mar. 6, 2019 (JP) ................ 2019-040717

(51) Int. Cl.
*C01B 33/141* (2006.01)
(52) U.S. Cl.
CPC ........ *C01B 33/141* (2013.01); *C01P 2004/64* (2013.01)
(58) Field of Classification Search
CPC .......... C01B 33/141; C01P 2004/64
See application file for complete search history.

(56) References Cited

U.S. PATENT DOCUMENTS

| | | | |
|---|---|---|---|
| 2,680,721 | A | 6/1954 | Broge et al. |
| 4,301,027 | A | 11/1981 | Blumcke et al. |

(Continued)

FOREIGN PATENT DOCUMENTS

| | | |
|---|---|---|
| CN | 102066252 A | 5/2011 |
| CN | 105283413 A | 1/2016 |

(Continued)

OTHER PUBLICATIONS

International Search Report dated Mar. 31, 2020, issued in application No. PCT/JP2020/007579 (counterpart to U.S. Appl. No. 17/436,126). (3 pages).

(Continued)

*Primary Examiner* — Richard M Rump
(74) *Attorney, Agent, or Firm* — WHDA, LLP (57) ABSTRACT

The present invention provides colloidal silica that exhibits excellent abrasiveness and contains, with high purity, deformed silica particles with excellent compactness and a large amount of alkoxy groups per unit area; the invention also provides a method for producing the colloidal silica in a simple manner with reduced costs. The invention provides colloidal silica containing silica particles having a bent structure and/or a branched structure, wherein the silica particles have a particle density of 1.95 or more, the silica particles have a ratio (m/n) of the content of alkoxy groups m (ppm) to the average primary particle size n (nm) of 200 or more, and the silica particles having a bent structure and/or a branched structure are present in an amount of 15% or more based on the number of particles in a given field of view as observed with a scanning electron microscope at 200,000-times magnification.

11 Claims, 3 Drawing Sheets

(56) References Cited

U.S. PATENT DOCUMENTS

| | | |
|---|---|---|
| 8,529,787 B2 | 9/2013 | Higuchi et al. |
| 9,422,457 B2 | 8/2016 | Grumbine et al. |
| 11,691,885 B2 * | 7/2023 | Omokawa .......... G03G 9/09725 430/108.7 |
| 12,162,764 B2 | 12/2024 | Fujimura et al. |
| 2009/0253813 A1 | 10/2009 | Ishiguri et al. |
| 2010/0071272 A1 | 3/2010 | Higuchi |
| 2010/0311871 A1 | 12/2010 | Suemura et al. |
| 2011/0163262 A1 | 7/2011 | Higuchi et al. |
| 2011/0209413 A1 | 9/2011 | Nishida et al. |
| 2013/0345461 A1 | 12/2013 | Bekiarian et al. |
| 2014/0335762 A1 | 11/2014 | Tamai et al. |
| 2015/0376018 A1 | 12/2015 | Suemura et al. |
| 2016/0130152 A1 | 5/2016 | Yoshitake et al. |
| 2016/0145110 A1 | 5/2016 | Suemura et al. |
| 2017/0001870 A1 | 1/2017 | Yoshitake et al. |
| 2018/0155591 A1 | 6/2018 | Kumazawa et al. |
| 2018/0208474 A1 | 7/2018 | Kim et al. |
| 2019/0010059 A1 | 1/2019 | Ashitaka et al. |
| 2019/0127230 A1 | 5/2019 | Taguchi et al. |
| 2020/0180968 A1 | 6/2020 | Ashitaka et al. |
| 2021/0061667 A1 | 3/2021 | Omokawa et al. |
| 2022/0127150 A1 | 4/2022 | Yamashita et al. |
| 2022/0144649 A1 | 5/2022 | Negishi et al. |
| 2022/0177318 A1 | 6/2022 | Otsuki et al. |

FOREIGN PATENT DOCUMENTS

| | | | |
|---|---|---|---|
| CN | 105813977 A | 7/2016 | |
| CN | 107848811 A | 3/2018 | |
| CN | 112299425 A | 2/2021 | |
| JP | H06-316407 A | 11/1994 | |
| JP | 2002-145609 A | 5/2002 | |
| JP | 2004-315300 A | 11/2004 | |
| JP | 2007-153732 A | 6/2007 | |
| JP | 2009-184856 A | 8/2009 | |
| JP | 2010-058985 A | 3/2010 | |
| JP | 2011-042522 A | 3/2011 | |
| JP | 2011-201719 A | 10/2011 | |
| JP | 2013-082584 A | 5/2013 | |
| JP | 2016-8147 A | 1/2016 | |
| JP | 2016-008157 A | 1/2016 | |
| JP | 2016-130290 A | 7/2016 | |
| JP | 2017-154914 A | 9/2017 | |
| JP | 2018-90798 A | 6/2018 | |
| JP | 6968632 B2 * | 11/2021 | .......... C01B 33/152 |
| TW | 201509808 A | 3/2015 | |
| TW | 202039367 A | 11/2020 | |
| TW | 202043149 A | 12/2020 | |
| WO | 2008/123373 A1 | 10/2008 | |
| WO | 2010/035613 A1 | 4/2010 | |
| WO | 2010/052945 A1 | 5/2010 | |
| WO | 2012/138365 A1 | 10/2012 | |
| WO | 2017038777 A1 | 3/2017 | |
| WO | 2017/170660 A1 | 10/2017 | |
| WO | 2019/049907 A1 | 3/2019 | |

OTHER PUBLICATIONS

Sears, "Determination of Specific Surface Area of Colloidal Silica by Titration with Sodium Hydroxide", Analytical Chemistry, 1956, vol. 28, No. 12, pp. 1981-1983 (3 pages).

Non-Final Office Action dated Dec. 21, 2023, issued in U.S. Appl. No. 17/436,126. (13 pages).

Zhou et al., "Study on surface modification of inorganic nano-SiO2 particles", New Chemical Materials, 2015, vol. 43, No. 2, pp. 167-170, with English abstract, cited in CN Office Action dated Nov. 30, 2023. (4 pages).

Non-Final Office Action dated Jun. 12, 2024, issued in U.S. Appl. No. 17/436,126. (18 pages).

International Search Report dated Mar. 31, 2020, issued in counterpart International Application No. PCT/JP2020/007574. (2 pages).

International Search Report dated Mar. 31, 2020, issued in counterpart International Application No. PCT/JP2020/007580 (3 pages).

Non-Final Office Action dated Jul. 2, 2024, issued in U.S. Appl. No. 17/436,177 (26 pages).

Non-Final Office Action dated Jan. 7, 2025, issued in U.S. Appl. No. 17/436,177. (17 pages).

* cited by examiner

COLLOIDAL SILICA AND PRODUCTION METHOD THEREFOR

TECHNICAL FIELD

The present invention relates to colloidal silica and a method for producing the colloidal silica. In particular, the present invention relates to colloidal silica containing deformed silica particles and a method for producing the colloidal silica.

In the present specification, "deformed" means having a bent structure and/or branched structure. The bent structure refers to at least 3 particles bound to each other in a line, but not in a straight line. The branched structure refers to at least 4 particles that are bound to each other, but not in a line (branched).

BACKGROUND ART

Colloidal silica, which is obtained by dispersing fine silica particles in a medium such as water, is used as a physical property improver in the fields of, for example, paper, textiles, and steel, and also used as an abrasive for electronic materials such as semiconductor wafers. The silica particles dispersed in colloidal silica used for these applications are required to have high purity and compactness.

To produce colloidal silica that can meet the above requirements, for example, a production method in which a hydrolyzed solution obtained by hydrolyzing an alkoxysilane is added to a mother liquor that contains an alkaline catalyst etc. is disclosed (see, for example, Patent Literature (PTL) 1).

According to the production method disclosed in PTL 1, an alkoxysilane is hydrolyzed to prepare a hydrolyzed solution, and the hydrolyzed solution is then added to the mother liquor. This method can form particles with excellent compactness and a high particle density; however, the production process of this method takes a long time, involves multiple steps, and is complicated and costly.

A production method in which an alkoxysilane is added to a mother liquor without hydrolysis to produce colloidal silica is also disclosed (see, for example, PTL 2).

However, PTL 2 nowhere discloses obtaining deformed silica particles, and colloidal silica obtained by the production method of PTL 2 cannot easily achieve high abrasiveness, leaving room to consider further improvement in abrasiveness.

CITATION LIST

Patent Literature

PTL 1: WO 2010/035613
PTL 2: JP2016-008147A

SUMMARY OF INVENTION

Technical Problem

The present inventors found that the colloidal silica produced by the production methods disclosed in PTL 1 and PTL 2 contains a reduced number of alkoxy groups per unit area of silica particles, which poses a problem of increasing defects on the surface of a substrate such as of a polished object, although high abrasiveness is achieved. The present inventors then conducted extensive research, thereby succeeding in developing silica with excellent abrasiveness and a high content of alkoxy groups. The inventors found that such colloidal silica can be suitably used as an abrasive and can successfully solve the above problems. The present invention has thus been completed.

An object of the present invention is to provide a colloidal silica that exhibits excellent abrasiveness and contains, with high purity, deformed silica particles with excellent compactness and a large number of alkoxy groups per unit area, and provide a production method that enables simple production of the colloidal silica and reduces production costs.

Solution to Problem

The present inventors conducted extensive research to achieve the above objects, and consequently found that the above objects can be achieved by a colloidal silica characterized by comprising silica particles having a bent structure and/or a branched structure, wherein the silica particles have a particle density of 1.95 or more, the silica particles have a ratio (m/n) of the content of alkoxy groups m (ppm) to the average primary particle size n (nm) of 200 or more, and the silica particles having a bent structure and/or a branched structure are present in an amount of 15% or more based on the number of particles in a given field of view as observed with a scanning electron microscope at 200,000-times magnification.

Specifically, the present invention relates to the following colloidal silica and method for producing the colloidal silica.

1. A colloidal silica comprising silica particles having a bent structure and/or a branched structure,
wherein
   the silica particles have a particle density of 1.95 or more,
   the silica particles have a ratio (m/n) of the content of alkoxy groups m (ppm) to the average primary particle size n (nm) of 200 or more, and
   the silica particles having a bent structure and/or a branched structure are present in an amount of 15% or more based on the number of particles in a given field of view as observed with a scanning electron microscope at 200,000-times magnification.
2. The colloidal silica according to Item 1, wherein the silica particles have a particle density of 1.95 or more and 2.20 or less.
3. The colloidal silica according to Item 1 or 2, wherein the silica particles contain 5 μmol or more of at least one amine selected from the group consisting of a primary amine, a secondary amine, and a tertiary amine, per gram of the silica particles wherein the amine contains no hydroxyl group as a substituent.
4. The colloidal silica according to any one of Items 1 to 3, wherein the silica particles have an organic functional group on the surface, the organic functional group being represented by the following formula (1)

$$—(CH_2)_k—R^5 \qquad (1)$$

wherein k represents an integer of 0 or more, and $R^5$ represents a functional group.
5. The colloidal silica according to any one of Items 1 to 4, wherein the silica particles have an organic cationic functional group on the surface.
6. The colloidal silica according to Item 5, wherein the silica particles have an amino group on the surface.
7. The colloidal silica according to any one of Items 1 to 4, wherein the silica particles have an organic anionic functional group on the surface.
8. The colloidal silica according to Item 7, wherein the silica particles have a sulfo group on the surface.

9. A method for producing colloidal silica, the method comprising in series
   (1) step 1 of preparing a mother liquor containing an alkaline catalyst and water,
   (2) step 2 of adding an alkoxysilane to the mother liquor to prepare a mixed liquid, and,
   (3) step 3 of adding an alkaline catalyst to the mixed liquid to prepare a seed particle dispersion, wherein the alkaline catalyst is at least one amine selected from the group consisting of a primary amine, a secondary amine, and a tertiary amine wherein the amine contains no hydroxyl group as a substituent.

10. The production method according to Item 9 or 10, comprising, after step 3, (4) step 4 of adding water and an alkoxysilane to the seed particle dispersion.

11. The production method according to any one of Items 9 to 11, wherein the molar ratio (s2/c1) of the amount of the alkoxysilane added s2 (mol) in step 2 to the amount of the alkaline catalyst in the mother liquor c1 (mol) is 800 or more.

12. The production method according to any one of Items 9 to 11, wherein the molar ratio (s2/c3) of the amount of the alkoxysilane added s2 (mol) in step 2 to the amount of the alkaline catalyst added c3 (mol) in step 3 is 185 or less.

Advantageous Effects of Invention

The colloidal silica according to the present invention exhibits excellent abrasiveness and contains, with high purity, deformed silica particles with excellent compactness and a large number of alkoxy groups per unit area. The method for producing colloidal silica according to the present invention also enables simple production of the colloidal silica and reduces production costs.

DESCRIPTION OF EMBODIMENTS

The following describes the colloidal silica and the method for producing the colloidal silica according to the present invention in detail.

The colloidal silica according to the present invention contains silica particles having a bent structure and/or a branched structure in an amount of 15% or more based on the number of particles in a given field of view as observed with a scanning electron microscope at 200,000-times magnification. Thus, the colloidal silica contains deformed silica particles with high purity, and is excellent in abrasiveness. Because the colloidal silica according to the present invention contains silica particles having a particle density of 1.95 or more, the colloidal silica is excellent in compactness and abrasiveness. In the colloidal silica according to the present invention, the silica particles have a ratio (m/n) of the content of alkoxy groups m (ppm) to the average primary particle size n (nm) of 200 or more, which indicates a high amount of alkoxy groups per unit area.

Because the production method according to the present invention prepares a mother liquor containing an alkaline catalyst and water in step 1, and adds an alkoxysilane to the mother liquor to prepare a mixed liquid in step 2, the production method according to the present invention, unlike in PTL 1, does not hydrolyze an alkoxysilane, and thus can simply produce colloidal silica that contains silica particles with excellent compactness and a large amount of alkoxy groups per unit area, with reduced production costs due to having fewer steps. Additionally, because the production method according to the present invention adds in step 2 an alkoxysilane to the mother liquor containing an alkaline catalyst and water prepared in step 1, and subsequently further adds an alkaline catalyst in step 3 to prepare seed particles, the seed particles are deformed; thus, the production method simply produces colloidal silica that contains deformed silica particles with high purity, and that is excellent in abrasiveness, with reduced production costs.

1. Colloidal Silica

The colloidal silica according to the present invention contains silica particles having a bent structure and/or a branched structure, wherein the silica particles have a particle density of 1.95 or more, the silica particles have a ratio (m/n) of the content of alkoxy groups m (ppm) to the average primary particle size n (nm) of 200 or more, and the silica particles having a bent structure and/or a branched structure are present in an amount of 15% or more based on the number of particles in a given field of view as observed with a scanning electron microscope at 200,000-times magnification.

The silica particles preferably contain at least one amine selected from the group consisting of a primary amine, a secondary amine, and a tertiary amine. The amine can be any amine, and is represented by the following formula (X).

$$NR_aR_bR_c \qquad (X)$$

wherein $R_a$, $R_b$, and $R_c$ each represent an optionally substituted $C_{1\text{-}12}$ alkyl group or hydrogen; however, ammonia, in which $R_a$, $R_b$, and $R_c$ are all hydrogen, is excluded.

$R_a$, $R_b$, and $R_c$ may be the same or different. $R_a$, $R_b$, and $R_c$ may be linear, branched, or cyclic.

The number of carbon atoms of a linear or branched alkyl group may be 1 to 12, preferably 1 to 8, and more preferably 1 to 6. Examples of linear alkyl groups include a methyl group, an ethyl group, a propyl group, a butyl group, a pentyl group, a hexyl group, a heptyl group, and an octyl group. Examples of branched alkyl groups include an isopropyl group, a 1-methylbutyl group, a 2-methylbutyl group, a 3-methylbutyl group, a 1,1-dimethylpropyl group, a 1,2-dimethylpropyl group, a 2,2-dimethylpropyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 1-methyl-1-ethylpropyl group, a 2-methyl-2-ethylpropyl group, a 1-ethylbutyl group, a 2-ethylbutyl group, a 1-ethylhexyl group, a 2-ethylhexyl group, a 3-ethylhexyl group, a 4-ethylhexyl group, and a 5-ethylhexyl group. Preferable linear or branched alkyl groups include an n-propyl group, an n-hexyl group, a 2-ethylhexyl group, and an n-octyl group.

The number of carbon atoms of a cyclic alkyl group may be, for example, 3 to 12, and preferably 3 to 6. Examples of cyclic alkyl groups include a cyclopropyl group, a cyclobutyl group, a cyclopentyl group, a cyclohexyl group, a cycloheptyl group, and a cyclooctyl group. Preferable cyclic alkyl groups include a cyclohexyl group.

The alkyl groups represented by $R_a$, $R_b$, and $R_c$ in formula (X) are optionally substituted. The number of substituents may be, for example, 0, 1, 2, 3, or 4, preferably 0, 1, or 2, and more preferably 0 or 1. An alkyl group with 0 substituents means an unsubstituted alkyl group. Examples of substituents include a $C_{1-3}$ alkoxy group (e.g., a methoxy group, an ethoxy group, a propoxy group, and an isopropoxy group), an amino group, a primary amino group substituted with a $C_{1-4}$ linear alkyl group, an amino group di-substituted with a $C_{1-4}$ linear alkyl group (e.g., a dimethylamino group, and a di-n-butylamino group), and an unsubstituted amino group. However, the hydroxyl group is excluded from the substituents. In an alkyl group having multiple substituents, the substituents may be the same or different.

$R_a$, $R_b$, and $R_c$ in formula (X) may be an optionally substituted $C_{1-8}$ (preferably $C_{1-6}$) linear or branched alkyl group. $R_a$, $R_b$, and $R_c$ may be a $C_{1-8}$ (preferably $C_{1-6}$) linear or branched alkyl group optionally substituted with a $C_{1-8}$ alkoxy group.

$R_a$, $R_b$, and $R_c$ may be unsubstituted. Preferably, $R_a$, $R_b$, and $R_c$ are an unsubstituted linear or branched $C_{1-12}$ alkyl group, or a linear or branched $C_{1-12}$ alkyl group substituted with an alkoxy group. Amines in an embodiment include at least one amine selected from the group consisting of 3-ethoxypropylamine, pentylamine, hexylamine, dipropylamine, and triethylamine. Of these, 3-ethoxypropylamine, dipropylamine, and triethylamine are more preferable. From the standpoint of increasing the content of even more deformed silica particles, 3-ethoxypropylamine is preferable.

The amines may be used singly, or in a combination of two or more.

The content of at least one amine selected from the group consisting of a primary amine, a secondary amine, and a tertiary amine (wherein the amine contains no hydroxyl group as a substituent) in silica particles is preferably 5 μmol or more, and more preferably 10 μmol or more, per gram of silica particles. A lower limit of the content of the amine falling within these ranges increases the content of deformed silica particles in colloidal silica, enabling colloidal silica to exhibit even more sufficient abrasiveness. The content of the amine is preferably 100 μmol or less, and more preferably 90 μmol or less, per gram of silica particles. An upper limit of the content of the amine falling within these ranges enables silica particles to become even more prone to deformation.

The content of the amine can be measured by the following method. Specifically, colloidal silica is centrifuged at 215000 G for 90 minutes, and then the supernatant is discarded. The solids are vacuum-dried at 60° C. for 90 minutes. 0.5 g of the obtained dry silica solids are weighed and added to 50 ml of a 1M aqueous sodium hydroxide solution, followed by heating at 50° C. for 24 hours with stirring to dissolve silica. The silica solution is analyzed by ion chromatography to determine the amine content. Analysis by ion chromatography is performed in accordance with JIS K0127.

The boiling point of the amine is preferably 85° C. or more, and more preferably 90° C. or more. A lower limit of the boiling point falling within these ranges further suppresses vaporization during the reaction, and enables the amine to be suitably used as a catalyst. The upper limit of the boiling point of the amine is, although not particularly limited to, preferably 500° C. or less, and more preferably 300° C. or less.

The silica particles preferably have a particle density of 1.95 or more, and more preferably 2.00 or more. A lower limit of the particle density falling within these ranges further increases the abrasiveness of the colloidal silica according to the present invention. The particle density is preferably 2.20 or less, and more preferably 2.16 or less. An upper limit of the particle density falling within these ranges further suppresses the formation of scratches on a polished object.

In the present specification, the particle density can be measured by drying and hardening a sample on a hot plate at 150° C., keeping the sample in a furnace at 300° C. for 1 hour, and then measuring its particle density by a liquid-phase displacement method by using ethanol.

The density of silanol groups of silica particles in colloidal silica can be determined by the Sears method. The Sears method was performed with reference to the following: G. N. Sears, Jr., "Determination of Specific Surface Area of Colloidal Silica by Titration with Sodium Hydroxide," Analytical Chemistry, 28 (12), 1981 (1956). The measurement is performed by titration with a 0.1 mol/L aqueous sodium hydroxide solution by using a 1 wt % silica dispersion, and calculating the density of silanol groups in accordance with the following formula.

$$\rho = (a \times f \times 6022)/(c \times S)$$

In the formula, ρ represents the density of silanol groups (the number of silanol groups/nm), a represents the amount of droplets of a 0.1 mol/L aqueous sodium hydroxide solution with a pH of 4 to 9 (mL), f represents the factor of a 0.1 mol/L aqueous sodium hydroxide solution, c represents the mass of silica particles (g), and S represents the BET specific surface area ($m^2/g$).

The silica particles have a ratio (m/n) of the content of alkoxy groups m (ppm) to the average primary particle size n (nm) of 200 or more. A ratio m/n of less than 200 cannot suppress the formation of defects on the surface of a polished object. The ratio m/n is preferably 250 or more, more preferably 300 or more, and still more preferably 320 or more. The ratio m/n is also preferably 2000 or less, more preferably 1500 or less, and still more preferably 1000 or less. An upper limit of the ratio m/n falling within these ranges further increases the abrasiveness of the colloidal silica according to the present invention.

The content of alkoxy groups can be determined by measuring the content of alkoxy groups m (ppm) and the average primary particle size n (nm) by the following methods, and calculating the ratio m/n.

Content of Alkoxy Groups m (ppm)

Colloidal silica is centrifuged at 215000 G for 90 minutes, and the supernatant is discarded. The solids are vacuum-dried at 60° C. for 90 minutes. 0.5 g of the obtained dry silica solids are weighed and added to 50 ml of a 1M aqueous sodium hydroxide solution, followed by heating the mixture at 50° C. for 24 hours with stirring to dissolve silica. The silica solution is analyzed by gas chromatography to determine the alcohol content, which is taken as the content of alkoxy groups. The detector for use in gas chromatography is a flame ionization detector (FID). Analysis by gas chromatography is performed in accordance with JIS K0114.

Average Primary Particle Size n (nm)

The colloidal silica is pre-dried on a hot plate and then heated at 800° C. for 1 hour to prepare a measurement sample. The BET specific surface area of the prepared measurement sample is measured. The average primary particle size (nm) of silica particles in the colloidal silica is calculated by using the value of 2727/BET specific surface area (m²/g), regarding the density of silica particles as 2.2.

In the colloidal silica according to the present invention, the silica particles having a bent structure and/or a branched structure are present preferably in an amount of 15% or more, and more preferably 20% or more, based on the number of particles in a given field of view as observed with a scanning electron microscope at 200,000-times magnification. A content of the silica particles falling within these ranges improves abrasiveness.

In the present specification, the content of the silica particles having a bent structure and/or a branched structure can be measured by the following measurement method. Specifically, the number of the particles having a bent structure and/or a branched structure out of the particles in a given field of view as observed with a scanning electron microscope (SEN) at 200,000-times magnification is counted, and the percentage of the particles is determined to be the content (%). The bent structure refers to at least 3 particles bound to each other in a line, but not in a straight line. The branched structure refers to at least 4 particles that are bound to each other, but not in a line (branched).

The silica particles in the colloidal silica have an average primary particle size of preferably 5 nm or more, and more preferably 10 nm or more. A lower limit of the average primary particle size of the silica particles falling within these ranges further increases the abrasiveness of the colloidal silica according to the present invention. The silica particles have an average primary particle size of preferably 200 nm or less, and more preferably 100 nm or less. An upper limit of the average primary particle size of the silica particles falling within these ranges further suppresses the formation of scratches on a polished object.

The silica particles in the colloidal silica have an average secondary particle size of preferably 8 nm or more, and more preferably 15 nm or more. A lower limit of the average secondary particle size of silica particles within these ranges further increases the abrasiveness of the colloidal silica according to the present invention. The silica particles have an average secondary particle size of preferably 400 nm or less, and more preferably 300 nm or less. An upper limit of the average secondary particle size of silica particles falling within these ranges further suppresses the formation of scratches on a polished object.

In the present specification, the average secondary particle size of silica particles in the colloidal silica can be measured by the following measurement method. Specifically, colloidal silica is added to a 0.3 wt % citric acid aqueous solution and homogenized to prepare a dynamic-light-scattering measurement sample. The secondary particle size of the measurement sample is measured by dynamic light scattering (ELSZ-2000S, produced by Otsuka Electronics Co., Ltd.).

The silica particles in the colloidal silica have an aggregation ratio of preferably 1.5 or more, and more preferably 1.7 or more. A lower limit of the aggregation ratio of the silica particles falling within these ranges further increases the abrasiveness of the colloidal silica according to the present invention. The silica particles also have an aggregation ratio of preferably 5.5 or less, and more preferably 5.0 or less. An upper limit of the aggregation ratio of the silica particles falling within these ranges further suppresses the formation of scratches on a polished object.

In the present specification, the aggregation ratio of silica particles in the colloidal silica is a value determined by dividing the average secondary particle size by the average primary particle size of the silica particles in the colloidal silica.

The silica particles in the colloidal silica preferably have on their surface an organic functional group represented by the following formula (1): —$(CH_2)_k$—$R^5$ (1). Due to the organic functional group represented by formula (1), aggregation of the colloidal silica is further suppressed. Due to the organic functional group represented by formula (1), interaction of the silica particles with other substances can be adjusted; for example, the abrasion performance of the silica particles as an abrasive can be adjusted by using electrostatic attraction or repulsion against a polished object, or the dispersibility can be enhanced when the silica particles are added to a polymer resin as a filler.

In formula (1), k represents an integer of 0 or more. k is preferably an integer of 1 or more. k is preferably an integer of 20 or less, and more preferably 12 or less.

In formula (1), $R^5$ represents a functional group. $R^5$ can be any functional group, including cationic, anionic, polar, and non-polar functional groups. The colloidal silica according to the present invention preferably has, for example, an organic cationic functional group, an organic anionic functional group, an organic polar functional group, or an organic non-polar functional group on the surface of the silica particles, and more preferably has an organic cationic functional group, or an organic anionic functional group.

The organic cationic functional group is not particularly limited, and includes an amino group.

The organic anionic functional group is not particularly limited, and includes a sulfo group and a carboxy group. Of these, a sulfo group is preferable.

The organic polar functional group and organic non-polar functional group are not particularly limited, and include a methyl group, an ethyl group, a propyl group, a hexyl group, a decyl group, a dodecyl group, an octadecyl group, a vinyl group, an epoxy group, a methacrylic group, and an acrylic group.

The organic functional group represented by formula (1) added to the surface of the silica particles in the colloidal silica can be confirmed by the following XPS measurement and zeta potential measurement.

XPS Measurement

Colloidal silica is centrifuged at 5° C. at 77,000 G for 90 minutes. The obtained precipitates are dried at 60° C. for 12 hours, and then ground with a mortar and a pestle, followed by drying under reduced pressure at 60° C. for 2 hours to prepare a dry powder.

The prepared dry powder is measured by X-ray photoelectron spectroscopy (XPS), and the peaks originating from the organic functional groups on the surface of particles are confirmed.

Zeta Potential Measurement

The zeta potential can be measured with a device using measurement principles such as electrophoretic light scattering, colloidal oscillating current, an electroacoustic method, and ultrasonic attenuation.

2. Method for Producing Colloidal Silica

The method for producing colloidal silica according to the present invention includes in series
(1) step 1 of preparing a mother liquor containing an alkaline catalyst and water,
(2) step 2 of adding an alkoxysilane to the mother liquor to prepare a mixed liquid, and
(3) step 3 of adding an alkaline catalyst to the mixed liquid to prepare a seed particle dispersion, wherein the alkaline catalyst is at least one amine selected from the group consisting of a primary amine, a secondary amine, and a tertiary amine wherein the amine contains no hydroxyl group as a substituent.

Step 1

Step 1 is preparing a mother liquor containing an alkaline catalyst and water.

The alkaline catalyst is at least one amine selected from the group consisting of a primary amine, a secondary amine, and a tertiary amine wherein the amine contains no hydroxyl group as a substituent. The amine for use can be those explained in the Colloidal Silica section above.

The content of the amine in the mother liquor is preferably 0.30 sol/kg or more, and more preferably 0.50 mmol/kg or more. A lower limit of the content of the amine falling within these ranges makes it easier to control the particle size. The content of the amine in the mother liquor is preferably 3.00 mmol/kg or less, and more preferably 2.50 mmol/kg or less. An upper limit of the content of the amine falling within these ranges makes the silica particles in colloidal silica more deformed.

The method for preparing the mother liquor can be any method. The mother liquor can be prepared by adding an alkaline catalyst to water by an ordinary method and stirring the mixture.

The pH of the mother liquor is, although not particularly limited to, preferably 9.5 or more, and more preferably 10.0 or more. A lower limit of the pH of the mother liquor falling within these ranges makes it easier to control the particle size. The pH of the mother liquor is preferably 11.5 or less, and more preferably 11.0 or less. An upper limit of the pH of the mother liquor falling within these ranges makes the silica particles in colloidal silica more deformed.

Step 2

Step 2 is adding an alkoxysilane to the mother liquor to prepare a mixed liquid.

The alkoxysilane is not particularly limited, and includes an alkoxysilane represented by the following formula (2)

$$\text{Si}(\text{OR}^1)_4 \tag{2}$$

wherein $R^1$ represents an alkyl group.

In formula (2), $R^1$ represents an alkyl group. $R^1$ can be any alkyl group, and is preferably a $C_{1-8}$ lower alkyl group, and more preferably a $C_{1-4}$ lower alkyl group. Specific examples of alkyl groups include a methyl group, an ethyl group, a propyl group, an isopropyl group, a butyl group, a pentyl group, and a hexyl group. The alkoxysilane represented by formula (2) is preferably tetramethoxysilane wherein $R^1$ is a methyl group (tetramethyl orthosilicate), tetraethoxysilane wherein $R^1$ is an ethyl group (tetraethyl orthosilicate), or tetraisopropoxysilane wherein $R^1$ is an isopropyl group; more preferably tetramethoxysilane wherein $R^1$ is a methyl group, or tetraethoxysilane wherein $R^1$ is an ethyl group; and still more preferably tetramethoxysilane.

The alkoxysilane represented by formula (2) may be used singly, or in a combination of two or more.

The amount of the alkoxysilane represented by formula (2) in the mixed liquid is not particularly limited. The molar ratio (s2/c1) of the amount of the alkoxysilane added s2 (mol) in step 2 to the amount of the alkaline catalyst c1 (mol) in the mother liquor is preferably 800 or more, and more preferably 960 or more. A lower limit of the molar ratio s2/c1 falling within these ranges enables the seed particles to become even more prone to deformation. The molar ratio s2/c1 is preferably 8500 or less, and more preferably 8000 or less. An upper limit of the molar ratio s2/c1 falling within these ranges suppresses the generation of additional nuclear particles during the reaction to further facilitate the growth of the main particles, while further suppressing gelation during the reaction.

The time period for adding an alkoxysilane is preferably 5 minutes or more, and more preferably 10 minutes or more. A lower limit of the time period for addition falling within these ranges makes it unlikely for gelation to occur during the reaction. The time period for adding an alkoxysilane is preferably 1000 minutes or less, and more preferably 600 minutes or less. An upper limit of the time period for addition falling within these ranges further increases productivity and further reduces production costs.

The pH of the mixed liquid is preferably 7.0 or less, and more preferably 6.5 or less. An upper limit of the pH of the mixed liquid falling within these ranges enables seed particles to become more prone to deformation. The pH of the mixed liquid is preferably 4.5 or more, and more preferably 4.9 or more. A lower limit of the pH of the mixed liquid falling within these ranges further suppresses gelation.

The temperature of the mixed liquid in step 2 is preferably 70° C. or more, and more preferably 75° C. or more. A lower limit of the temperature of the mixed liquid falling within these ranges further suppresses gelation during the reaction. The temperature of the mixed liquid is also preferably 95° C. or less, and more preferably 90° C. or less. An upper limit of the temperature of the mixed liquid falling within these ranges further suppresses the vaporization of the alkoxysilane.

Step 3

Step 3 is adding an alkaline catalyst to the mixed liquid to prepare a seed particle dispersion.

The time period from the end of addition of the alkoxysilane until the start of addition of the alkaline catalyst in step 3 ("aging time" below) is preferably 0 minutes or more and 1500 minutes or less. The aging time enables the control of the degree of deformation. An aging time falling within these ranges provides particles with a desired degree of deformation, while ensuring productivity.

The alkaline catalyst is at least one amine selected from the group consisting of a primary amine, a secondary amine, and a tertiary amine wherein the amine contains no hydroxyl group as a substituent. The amine for use can be those explained in the Colloidal Silica section above. The alkaline catalyst for use in step 3 may be the same alkaline catalyst as or different from the alkaline catalyst used in step 1.

The amount of the alkaline catalyst added in step 3 is not particularly limited. The molar ratio (s2/c3) of the amount of the alkoxysilane added s2 (mol) in step 2 to the amount of the alkaline catalyst added c3 (mol) in step 3 is preferably 185 or less, and more preferably 105 or less. An upper limit of the molar ratio s2/c3 falling within these ranges makes it easier to control the average primary particle size of the silica particles. The molar ratio s2/c3 is also preferably 30 or more, and more preferably 35 or more. A lower limit of the molar ratio s2/c3 falling within these ranges further suppresses gelation.

The pH of the seed particle dispersion is preferably 8.0 or more, and more preferably 8.5 or more. A lower limit of the pH of the seed particle dispersion falling within these ranges further suppresses gelation. The pH of the seed particle dispersion is also preferably 12.0 or less, and more preferably 11.0 or less. An upper limit of the pH of the seed particle dispersion falling within these ranges further suppresses the dissolution of silica particles.

The temperature of the seed particle dispersion in step 3 is preferably 70° C. or more, and more preferably 75° C. or more. A lower limit of the temperature of the seed particle dispersion falling within these ranges makes it easier to control the average primary particle size of the silica particles. The temperature of the seed particle dispersion is preferably 95° C. or less, and more preferably 90° C. or less. An upper limit of the temperature of the seed particle dispersion falling within these ranges further suppresses gelation.

Step 4

The production method according to the present invention may include, after step 3, (4) step 4 of adding water and an alkoxysilane to the seed particle dispersion.

The alkoxysilane for use may be the same alkoxysilane as that explained in the Step 2 section above. The alkoxysilane for use in step 4 may the same as or different from the alkoxysilane used in step 2.

The alkoxysilane in step 4 may be used singly, or in a combination of two or more.

The alkoxysilane for use in step 4 may be an alkoxysilane having an organic functional group, as well as the alkoxysilane represented by formula (2), which is a tetzaalkoxysilane that has no organic functional group, explained in the Step 2 section above.

The alkoxysilane having an organic functional group includes an alkoxysilane represented by the following formula (3) and an alkoxysilane represented by the following formula (4).

$$(OR^1)_3Si[(CH_2)_k—R^5] \quad (3)$$

$$(OR^1)_2Si[(CH_2)_k—R^5][(CH_2)_k—R^6] \quad (4)$$

In formulas (3) and (4), $R^1$ is defined in the same manner as $R^1$ of formula (2), and $R^5$ and $R^6$ are defined in the same manner as $R^5$ of formula (1).

Specific examples of alkoxysilanes represented by formula (3) or (4) include alkoxysilanes having one, or two or more organic functional groups in their molecule, such as methyltrimethoxysilane, dimethyldimethoxysilane, trimethylmethoxysilane, methyltriethoxysilane, dimethyldiethoxysilane, trimethylethoxysilane, phenyltrimethoxysilane, benzyltriethoxysilane, propyltrimethoxysilane, propyltriethoxysilane, diethoxymethylphenylsilane, allyltriethoxysilane, vinyltriethoxysilane, aminopropyltriethoxysilane, aminopropyltrimethoxysilane, N-2-(aminoethyl)-3-aminopropyltrimethoxysilane, N-2-(aminoethyl)-3-aminopropylmethyldimaethoxysilane, N-phenyl-3-aminopropyltrimethoxysilane, N-trimethoxysilylpropyl-N,N,N-trimethylamnonium chloride, 3-mercaptopropyltrimethoxysilane, 3-mercaptopropylmethyldimethoxysilane, 3-sulfopropyltrimethoxysilane, 3-glycidoxypropyltrimethoxysilane, 3-methacryloxypropylmethyldimethoxysilane, 3-glycidoxypropyltriethoxysilane, 3-methacryloxypropylmethyldiethoxysilane, 3-methacryloxypropyltrimethoxysilane, 3-methacryloxypropyltriethoxysilane, and 3-acryloxypropyltrimethoxysilane; and chlorosilanes, such as trimethylchlorosilane and diethyldichlorosilane.

The alkoxysilanes having an organic functional group can be used singly, or in a combination of two or more.

The amount of the alkoxysilane having an organic functional group added is preferably 0.0004-fold mol to 0.03-fold mol, and more preferably 0.001-fold mol to 0.03-fold mol of the amount of the alkoxysilane represented by formula (2). An overly small proportion of the alkoxysilane having an organic functional group added may lead to fewer organic functional groups incorporated into the particles, resulting in a failure to add desired properties. An overly large proportion of the alkoxysilane having an organic functional group added may lead to increased secondary particle size, formation of aggregates, and gelation.

An alkoxysilane added in step 4 may be an alkoxysilane diluted with an organic solvent beforehand. The organic solvent for use in step 4 may be, for example, a hydrophilic organic solvent. Specific examples include alcohols, such as methanol, ethanol, n-propanol, isopropanol, ethylene glycol, propylene glycol, and 1,4-butanediol; ketones, such as acetone and methyl ethyl ketone; and esters, such as ethyl acetate. These organic solvents may be used singly, or in a combination of two or more. In particular, from the standpoint of industrial availability, the organic solvent for use in the present invention is preferably an alcohol, more preferably methanol or ethanol, and still more preferably methanol. This is because alcohols are readily displaced by water by heat distillation during water displacement. The organic solvent for use is more preferably the same alcohol as the alcohol formed by hydrolysis of the alkoxysilane. For example, if tetramethyl orthosilicate is used as alkoxysilane, hydrolysis of the silicate forms methanol in the reaction system; thus, methanol is used as an organic solvent. In this way, the solvent is easily recovered and reused.

The amount of the organic solvent added in step 4 is preferably 0-fold mass to 3-fold mass, and more preferably 0-fold mass to 1.5-fold mass of the total amount of the alkoxysilane added. An upper limit of the amount of the organic solvent added falling within these ranges makes it easier to suppress the reduction in particle density.

The amount of the alkoxysilane added in step 4 is not particularly limited. The molar ratio (s4/sp4) of the amount of the alkoxysilane added s4 (mol) in step 4 to the amount of seed particles in the seed particle dispersion sp4 (mol) is preferably 0 or more and 30 or less. An upper limit of the molar ratio s4/sp4 falling within these ranges makes it unlikely for nuclear particles to newly form during the reaction, and further facilities the growth of the main particles. The molar ratio is based on the molecular weight of the seed particles defined as 60.08 g/mol.

The amount of water added in step 4 is preferably 0 parts by mass or more and 55.0 parts by mass or less, per part by mass of the seed particles. An upper limit of the amount of water added falling within this range enables more efficient production of colloidal silica.

The pH of the colloidal silica in step 4 is preferably 11.0 or less, and more preferably 10.0 or less. An upper limit of the pH of the colloidal silica falling within these ranges further suppresses the dissolution of silica particles. The pH of the colloidal silica is also preferably 6.5 or more, and more preferably 7.0 or more. A lower limit of the pH of the colloidal silica falling within these ranges further suppresses gelation.

The temperature of the colloidal silica in step 4 is preferably 70° C. or more, and more preferably 75° C. or more. A lower limit of the temperature of the colloidal silica falling within these ranges further suppresses gelation. The temperature of the colloidal silica is also preferably 90° C. or less, and more preferably 85° C. or less. An upper limit of the temperature of the colloidal silica falling within these ranges further suppresses the vaporization of the alkoxysilane.

The time period for adding an alkoxysilane in step 4 is preferably 0 minutes or more and 1000 minutes or less. A time period for addition falling within this range makes it unlikely for nuclear particles to newly form during the reaction, and further facilitates the growth of the main particles.

The method for producing colloidal silica according to the present invention may further include, after step 3 or step 4, the step of concentrating the colloidal silica. The concentration method is not particularly limited, and the colloidal silica may be concentrated by a known method. Examples of concentration methods include heat concentration at about 65 to 100° C., and concentration by ultrafiltration.

The concentration of silica particles in concentrated colloidal silica is, although not particularly limited to, preferably about 1 to 50 mass % based on the colloidal silica taken as 100 mass %.

The method for producing colloidal silica according to the present invention may further include, after step 3 or step 4, the step of distilling out of the system the methanol formed as a by-product during the reaction. The method for distilling methanol out of the system is not particularly limited. An example of such methods is replacing the dispersion medium with pure water by adding pure water dropwise, while heating the colloidal silica to maintain the volume at a constant level. Examples of other methods include a method of separating colloidal silica from the solvent by precipitation, separation, centrifugation, etc., and re-dispersing the colloidal silica in water; and a method of replacing the solvent with water by ultrafiltration.

Step 5

If the colloidal silica according to the present invention has the organic functional group represented by formula (1), the method for producing colloidal silica according to the present invention may further include, after step 4, step 5 of adding an alkoxysilane having an organic functional group.

In step 5, the alkoxysilane having an organic functional group for use can be the alkoxysilane having an organic functional group represented by formula (3) or (4).

If the organic functional group is an organic cationic functional group, the alkoxysilane having the cationic functional group includes the alkoxysilane having an organic functional group represented by formula (3) or (4).

If the organic functional group is an organic cationic functional group, the silane coupling agent includes aminopropyltrimethoxysilane, (aminoethyl)aminopropyltrimethoxysilane, (aminoethyl)aminopropyltriethoxysilane, aminopropyltriethoxysilane, aminopropyldimethylethoxysilane, aminopropylmethyldiethoxysilane, and aminobutyltriethoxysilane.

If the organic functional group is an organic cationic functional group, the amount of the alkoxysilane having an organic functional group added in step 5 is, although not particularly limited to, preferably 0.5 to 350 µmol, and more preferably 5.5 to 170 µmol, per gram of the solids of the colloidal silica before a silane coupling agent is added. A lower limit of the amount of the silane coupling agent added falling within these ranges makes the degree of modification of colloidal silica even more sufficient, provides modified colloidal silica that can be stably dispersed for a longer period of time, and can further increase electrostatic attraction or repulsion against a polished object due to the increased positive charge of colloidal silica under acidic conditions. An upper limit of the amount of the alkoxysilane having an organic functional group added falling within these ranges further suppresses an increase in secondary particle size, formation of aggregates, and gelation.

In step 5, if the organic functional group is an organic anionic functional group, in particular, a sulfo group, the alkoxysilane having an organic functional group is, for example, preferably an alkoxysilane having an organic functional group that contains a functional group chemically convertible to a sulfonic acid group. Examples of such alkoxysilanes having an organic functional group include 1) an alkoxysilane having an organic functional group that contains a sulfonic acid ester group convertible to a sulfonic acid group by hydrolysis, and 2) an alkoxysilane having an organic functional group that contains a mercapto group and/or a sulfide group convertible to a sulfonic acid group by oxidation. Because the modification of the colloidal silica surface with a sulfonic acid is performed in a solution, the latter, i.e., an alkoxysilane having an organic functional group that contains a mercapto group and/or a sulfide group, is preferably used in order to enhance modification efficiency.

Examples of alkoxysilanes having an organic functional group that contain a mercapto group include 3-mercaptopropyltrimethoxysilane, 2-mercaptopropyltriethoxysilane, 2-mercaptoethyltrimethoxysilane, and 2-mercaptoethyltriethoxysilane.

Examples of alkoxysilanes having an organic functional group that contain a sulfide group include bis(3-triethoxysilylpropyl)disulfide.

If the organic functional group is an organic anionic functional group, in particular, a sulfo group, the amount of the silane coupling agent for use in step 5 is, although not particularly limited to, preferably 0.5 to 350 µmol, and more preferably 5.5 to 170 µmol, per gram of the solids of colloidal silica before the silane coupling agent is added. A lower limit of the amount of the alkoxysilane having an organic functional group falling within these ranges further stabilizes the zeta potential under acidic conditions. An upper limit of the amount of the alkoxysilane having an organic functional group added falling within these ranges further suppresses an increase in secondary particle size, the formation of aggregates, and gelation.

The methods for oxidizing a modified mercapto group and sulfide group include a method using an oxidant. Examples include nitric acid, hydrogen peroxide, oxygen, ozone, organic peracid (percarboxylic acid), bromine, hypochlorite, potassium permanganate, and chromic acid. Of these oxidants, hydrogen peroxide and organic peracid (peracetic acid, perbenzoic acid) are preferable from the standpoint of relatively easy handling and excellent oxidation yields. From the standpoint of by-products that form during the reaction, hydrogen peroxide is most preferably used.

The amount of the oxidant added is preferably 3-fold mol to 100-fold mol of the alkoxysilane having an organic functional group. The upper limit of the amount of the oxidant added is, although not particularly limited to, more preferably about 50-fold mol. In the colloidal silica and the alkoxysilane having an organic functional group, functional groups other than the functional groups oxidized (converted) into a sulfonic acid group have a stable structure in an oxidation reaction, thereby suppressing the formation of by-products.

In step 5, the temperature at which the silane coupling agent is added is, although not particularly limited to, preferably from room temperature (about 20° C.) to the boiling point. The reaction time period is, although not particularly limited to, preferably 10 minutes to 10 hours, and more preferably 30 minutes to 2 hours. The pH at which the silane coupling agent is added is, although not particularly limited to, preferably 3 or more and 11 or less. A pH falling within this range further facilitates the reaction between the silane coupling agent and the silica surface, and further suppresses self-condensation between the molecules of the silane coupling agent. Additionally, a pH falling within this range requires a smaller amount of an acidic or basic substance for adjusting the pH, and stably retains the silica particles.

The alkoxysilane having an organic functional group is preferably diluted with an organic solvent and then added to colloidal silica. Diluting the alkoxysilane having an organic functional group with an organic solvent suppresses an increase in secondary particle size and the formation of aggregates. In diluting an alkoxysilane with an organic solvent, the dilution factor for the alkoxysilane having an organic functional group is not particularly limited. An alkoxysilane can be diluted with an organic solvent so that the proportion (concentration) of the alkoxysilane having an organic functional group is 0.1 to 100 mass %, and preferably 1 to 100 mass %. The organic solvent is, although not particularly limited to, preferably a hydrophilic organic solvent, including lower alcohols such as methanol, ethanol, isopropanol, and butanol.

The colloidal silica according to the present invention contains metallic impurities, such as sodium, potassium, iron, aluminum, calcium, magnesium, titanium, nickel, chromium, copper, zinc, lead, silver, manganese, and cobalt, preferably in an amount of 1 ppm or less. Due to the content of metallic impurities of 1 ppm or less, the colloidal silica according to the present invention can suitably be used in polishing electronic materials and other like materials.

The colloidal silica according to the present invention and the colloidal silica produced by the production method according to the present invention have a variety of applications such as abrasives and paper coating agents. An abrasive containing the colloidal silica is also encompassed in the scope of the present invention. Because the colloidal silica according to the present invention can be highly pure with a content of metallic impurities (e.g., sodium) of 1 ppm or less, the colloidal silica is suitable for use, in particular, in abrasives for chemical mechanical polishing of semiconductor wafers.

EXAMPLES

The present invention will be described in detail below with reference to Examples. However, the present invention is not limited to the Examples.

Example 1

Step 1: 7500 g of pure water as a solvent was placed in a flask, and 1.93 g of 3-ethoxypropylamine (3-EOEA) as an alkaline catalyst was added thereto to prepare a mother liquor. The pH of the mother liquor was 10.5.
Step 2: The mother liquor was heated to an internal temperature of 85° C., and 2740 g of tetramethyl orthosilicate was added dropwise to the mother liquor at a constant rate over a period of 60 minutes, while the temperature was adjusted to maintain the internal temperature, to prepare a mixed liquid.
Step 3: After stirring for 15 minutes, 50.14 g of 3-ethoxypropylamine (3-EOPA) was added to the mixed liquid to prepare a seed particle dispersion. The pH of the seed particle dispersion was 10.3.
Step 4: 2452 g of the seed particle dispersion and 5537 g of pure water were placed in a flask. Thereafter, this mixture was heated to an internal temperature of 80° C., and 1762.7 g of tetramethyl orthosilicate was added dropwise at a constant rate over a period of 360 minutes while the temperature was adjusted to maintain the internal temperature. After completion of the dropwise addition, stirring was performed for 15 minutes to prepare a deformed-silica-containing liquid. Subsequently, the deformed-silica-containing liquid was collected in an amount of 800 mL as a base amount under ordinary pressure. Then, while feeding colloidal silica and maintaining the volume constant, the collected liquid was heated and concentrated so that the silica concentration was 20 wt %. Subsequently, while keeping the volume constant, the dispersion medium was replaced with 500 mL of pure water to distil off methanol obtained as a by-product during the reaction, whereby colloidal silica was prepared. Table 1 shows the physical properties of the obtained colloidal silica.

Example 2

Step 1: 7500 g of pure water as a solvent was placed in a flask, and 0.580 g of 3-ethoxypropylamine (3-EOPA) as an alkaline catalyst was added thereto to prepare a mother liquor. The pH of the mother liquor was 10.2.
Step 2: The mother liquor was heated to an internal temperature of 85° C., and 2740 g of tetramethyl orthosilicate was added dropwise to the mother liquor at a constant rate over a period of 120 minutes, while the temperature was adjusted to maintain the internal temperature, to prepare a mixed liquid.
Step 3: After stirring for 420 minutes, 50.12 g of 3-ethoxypropylamine (3-EOPA) was added to the mixed liquid to prepare a seed particle dispersion. The pH of the seed particle dispersion was 10.3.
Step 4: 2331 g of the seed particle dispersion and 5265 g of pure water were placed in a flask. Thereafter, this mixture was heated to an internal temperature of 80° C., and 1957 g of tetramethyl orthosilicate was added dropwise at a constant rate over a period of 360 minutes while the temperature was adjusted to maintain the internal temperature. After completion of the dropwise addition, stirring was performed for 15 minutes to prepare a deformed-silica-containing liquid. Subsequently, the deformed-silica-containing liquid was collected in an amount of 800 mL as a base amount under ordinary pressure. Then, while feeding colloidal silica and maintaining the volume constant, the collected liquid was heated and concentrated so that the silica concentration was 20 wt %. Subsequently, while keeping the volume constant, the dispersion medium was replaced with 500 mL of pure water to distil off methanol obtained as a by-product during the reaction, whereby a colloidal silica was prepared. Table 1 shows the physical properties of the obtained colloidal silica.

Example 3

Figure 1:
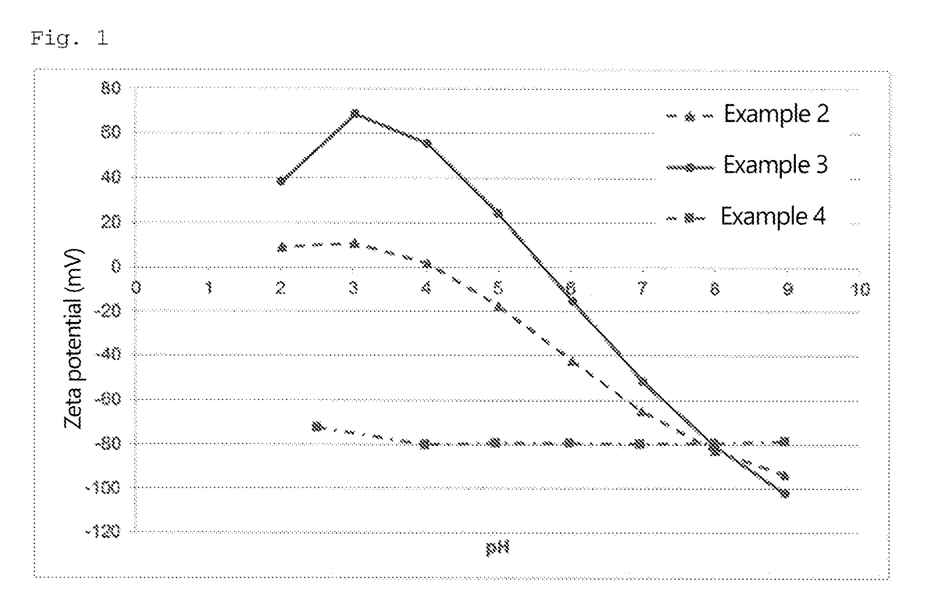
FIG. 1 is a graph showing the measurement results of zeta potential of the colloidal silica obtained in Examples 2, 3, and 4.

Colloidal silica (silica concentration: 20 mass %) was prepared in the same manner as in Example 2.
Step 5
9.2 g of 3-ethoxypropylamine (3-EOPA) was added to 10085 g of the prepared colloidal silica, and the pH was adjusted to 9. Heating was then performed to 50° C., and a mixed liquid of 10.2 g of 3-aminopropyltrimethoxysilane and 331.5 g of methanol was added. Subsequently, while keeping the volume constant, the dispersion medium was replaced with 5000 mL of pure water to distil off methanol from the liquid, whereby colloidal silica containing silica particles whose surface was modified with an organic cationic functional group was prepared. FIG. 1 shows the zeta potential of the obtained colloidal silica.

Example 4

Colloidal silica (silica concentration: 20 mass %) was prepared in the same manner as in Example 2.

Step 5

0.9 g of 3-ethoxypropylamine (3-EOPA) was added to 830 g of the prepared colloidal silica, and the pH was adjusted to 9. Subsequently, 10.0 g of 3-mercaptopropyltrimethoxysilane and 21.3 g of a 30% aqueous solution of hydrogen peroxide were added at room temperature. Then, while keeping the volume constant, the dispersion medium was replaced with 600 mL of pure water to distill off methanol from the liquid, and the resulting product was heated and refluxed for 3 hours, whereby colloidal silica comprising silica particles whose surface was modified with an organic anionic functional group was prepared. FIG. 1 shows the zeta potential of the obtained colloidal silica.

Example 5

Step 1: 7500 g of pure water as a solvent was placed in a flask, and 0.774 q of 3-ethoxypropylamine (3-EOPA) as an alkaline catalyst was added thereto to prepare a mother liquor. The pH of the mother liquor was 10.2.

Step 2: The mother liquor was heated to an internal temperature of 85° C., and 2740 q of tetramethyl orthosilicate was added dropwise to the mother liquor at a constant rate over a period of 60 minutes, while the temperature was adjusted to maintain the internal temperature, to prepare a mixed liquid.

Step 3: After stirring for 60 minutes, 28.00 g of 3-ethoxypropylamine (3-EOPA) was added to the mixed liquid to prepare a seed particle dispersion. The pH of the seed particle dispersion was 9.5. Subsequently, the seed particle dispersion was collected in an amount of 800 mL as a base amount under ordinary pressure. Then, while feeding colloidal silica and maintaining the volume constant, the collected dispersion was heated and concentrated so that the silica concentration was 20 wt %. Subsequently, while keeping the volume constant, the dispersion medium was replaced with 400 mL of pure water to distill off methanol obtained as a by-product during the reaction, whereby colloidal silica was prepared. Table 1 shows the physical properties of the obtained colloidal silica.

Example 6

Step 1: 7500 g of pure water as a solvent was placed in a flask, and 1.328 g of dipropylamine (DPA) as an alkaline catalyst was added thereto to prepare a mother liquor. The pH of the mother liquor was 10.9.

Step 2: The mother liquor was heated to an internal temperature of 85° C., and 2740 g of tetramethyl orthosilicate was added dropwise to the mother liquor at a constant rate over a period of 60 minutes, while the temperature was adjusted to maintain the internal temperature, to prepare a mixed liquid.

Step 3: After stirring for 15 minutes, 49.18 g of dipropylamine (DPA) was added to the mixed liquid to prepare a seed particle dispersion. The pH of the seed particle dispersion was 10.4. Subsequently, the seed particle dispersion was collected in an amount of 800 mL as a base amount under ordinary pressure. Then, while keeping the volume constant, the dispersion medium was replaced with 1400 mL of pure water to distill off methanol obtained as a by-product during the reaction, whereby colloidal silica was prepared. The colloidal silica had a silica concentration of 10 wt %. Table 1 shows the physical properties of the obtained colloidal silica.

Example 7

Step 1: 7500 g of pure water as a solvent was placed in a flask, and 1.328 g of triethylamine (TEA) as an alkaline catalyst was added thereto to prepare a mother liquor. The pH of the mother liquor was 10.8.

Step 2: The mother liquor was heated to an internal temperature of 85° C., and 2740 g of tetramethyl orthosilicate was added dropwise to the mother liquor at a constant rate over a period of 60 minutes, while the temperature was adjusted to maintain the internal temperature, to prepare a mixed liquid.

Step 3: After stirring for 15 minutes, 49.18 g of triethylamine (TEA) was added to the mixed liquid to prepare a seed particle dispersion. The pH of the seed particle dispersion was 10.1. Subsequently, the seed particle dispersion was collected in an amount of 800 mL as a base amount under ordinary pressure. Then, while keeping the volume constant, the dispersion medium was replaced with 650 mL of pure water to distill off methanol obtained as a by-product during the reaction, whereby colloidal silica was prepared. The colloidal silica had a silica concentration of 10 wt %. Table 1 shows the physical properties of the obtained colloidal silica.

Comparative Example 1

0.151 g of a 25% aqueous tetramethylammonium hydroxide (TMAH) solution was added to 1732 g of water, and the mixture was stirred to prepare a mother liquor. The mother liquor was heated to reflux. Further, tetramethyl orthosilicate was hydrolyzed to prepare a 9% aqueous silicic acid solution. Then, 346.5 g of the aqueous silicic acid solution was added dropwise to the mother liquor over a period of 3 hours under reflux, followed by refluxing for 30 minutes. Subsequently, 1.26 g of a 25% aqueous tetramethylammonium hydroxide (TMAH) solution was added dropwise to prepare a seed particle dispersion. Then, 2910 g of water was added to the seed particle dispersion, and the mixture was stirred, heated, and refluxed. Thereafter, 600 q of a mixture of water and methanol was extracted while 500 q of the 9% aqueous silicic acid solution and 1.21 g of a 25% aqueous tetramethylammonium hydroxide (TMAH) solution were added dropwise over a period of 2.5 hours. This procedure was performed 26 times to prepare colloidal silica. Table 1 shows the physical properties of the obtained colloidal silica. The colloidal silica obtained in Comparative Example 1 was revealed to have a value of m/n smaller than those of Examples 1 and 2.

Comparative Example 2

0.365 q of a 251 aqueous tetramethylammonium hydroxide (TMA) solution was added to 2000 g of water, and the mixture was stirred to prepare a mother liquor. The mother liquor was heated to 80° C. While the temperature of the mother liquor was maintained at 80° C., 228 g of tetramethyl orthosilicate was added dropwise over a period of 3 hours. Immediately after that, 2.92 g of a 25% aqueous tetramethylammonium hydroxide (TMAH) solution was added. While the temperature was maintained at 80° C., 228 g of tetramethyl orthosilicate and 3.19 g of a 25% aqueous tetramethylammonium hydroxide (TMAH) solution were added dropwise over a period of 3 hours. This procedure was performed 4 times to prepare colloidal silica. Table 1 shows the physical properties of the obtained colloidal silica. The colloidal silica obtained in Comparative Example 2 was revealed to have a low content of bent and/or branched particles.

The characteristics of the colloidal silica of the Examples and Comparative Examples obtained as described above were evaluated according the following methods.

Average Primary Particle Size n

Colloidal silica was pre-dried on a hot plate and then heated at 800° C. for 1 hour to prepare a measurement sample. The BET specific surface area of the prepared measurement sample was measured. The average primary particle size n (nm) of silica particles in the colloidal silica was calculated by using the value of 2727/BET specific surface area (m²/g), regarding the density of silica particles as 2.2.

Average Secondary Particle Size

Colloidal silica was added to a 0.3 wt % citric acid aqueous solution and homogenized to prepare a dynamic-light-scattering measurement sample. The secondary particle size of the measurement sample was measured by dynamic light scattering (ELSZ-2000S, produced by Otsuka Electronics Co., Ltd.).

Aggregation Ratio

The aggregation ratio was calculated in accordance with the following formula: average secondary particle size/average primary particle size.

Content of Bent and/or Branched Particles

The number of the particles having a bent structure and/or a branched structure out of the particles in a given field of view as observed with a scanning electron microscope (SEM) at 200,000-times magnification was counted, and the percentage of the particles was determined to be the content of bent and/or branched particles (%). The bent structure refers to at least 3 particles bound to each other in a line, but not in a straight line. The branched structure refers to at least 4 particles that are bound to each other, but not in a line (branched).

Amine Content

Colloidal silica was centrifuged at 215000 G for 90 minutes, and the supernatant was discarded. The solids were vacuum-dried at 60° C. for 90 minutes. 0.5 g of the obtained dry silica solids were weighed and added to 50 ml of a 1M aqueous sodium hydroxide solution, followed by heating at 50° C. for 24 hours with stirring to dissolve silica. The silica solution was analyzed by ion chromatography to determine the amine content. Ion chromatography analysis was performed in accordance with JIS K0127.

Content of Alkoxy Groups m (ppm)

Colloidal silica was centrifuged at 215000 G for 90 minutes, and the supernatant was discarded. The solids were vacuum-dried at 60° C. for 90 minutes. 0.5 g of the obtained dry silica solids were weighed and added to 50 ml of a 1M aqueous sodium hydroxide solution, followed by heating at 50° C. for 24 hours with stirring to dissolve silica. The silica solution was analyzed by gas chromatography to determine the alcohol content, which was defined as the content of alkoxy groups. The detector for use in gas chromatography was a flame ionization detector (FID). Gas chromatography analysis was performed in accordance with JIS K0114.

Ratio (m/n) of Content of Alkoxy Groups m (ppm) to Average Primary Particle Size n (n.)

The value determined based on the content of alkoxy groups m (ppm) to the average primary particle size n (nm) was defined as m/n.

Particle Density

The sample was dried and hardened on a hot plate at 150° C. and kept in a furnace at 300° C. for 1 hour. Then, the particle density was measured by a liquid-phase displacement method by using ethanol.

Density of Silanol Groups

The density of silanol groups of silica particles in colloidal silica can be determined by the Sears method. The Sears method was performed with reference to the following: G. W. Sears, Jr., "Determination of Specific Surface Area of Colloidal Silica by Titration with Sodium Hydroxide," Analytical Chemistry, 28(12), 1981 (1956). The measurement was performed by titration with a 0.1 mol/L aqueous sodium hydroxide solution by using a 1 wt % silica dispersion, and calculating the density of silanol groups in accordance with the following formula.

$$\rho = (a \times f \times 6022)/(c \times S)$$

In the formula, ρ represents the density of silanol groups (the number of silanol groups/nm²), a represents the amount of droplets of a 0.1 mol/L aqueous sodium hydroxide solution with a pH of 4 to 9 (mL), f represents the factor of a 0.1 mol/L aqueous sodium hydroxide solution, c represents the mass of silica particles (g), and S represents the BET specific surface area (m²/g).

TABLE 1

| | Ex. 1 | Ex 2 | Ex, 5 | Ex. 6 | Ex. 7 | Comp. Ex. 1 | Comp. Ex 2 |
|---|---|---|---|---|---|---|---|
| Average primary particle size n (nm) | 20 | 31 | 14 | 14 | 16 | 45 | 26 |
| Average secondary Wide size (nm) | 36 | 62 | 36 | 46 | 77 | 75 | 42 |
| Aggregation ratio | 1.8 | 2.0 | 2.6 | 3.3 | 4.8 | 1.7 | 1.6 |
| Content of bent and for branched partides (%) | 21 | 24 | 24 | 24 | 24 | 29 | 1 |
| Particle density | 2.12. | 112 | 2.14 | 113 | 2..12 | 222 | 2.12 |
| Type of amine contained | 3-EOPA | 3-EOPA | 3 - EOPA | DPA | TEA | TMAH | IMAH |
| Amine content (μmol/g) | 54 | 39 | 78 | 18 | 25 | 55 | 105 |
| m/n (content of alkoxy groups m (ppm)/ average primary particle size n (nm)) | 520 | 353 | 667 | 465 | 409 | 148 | 505 |
| Density of silanol groups (number of silanol group/nm²) | 1.5 | 1.7 | 1.7 | — | — | 1.8 | — |

Figure 4:
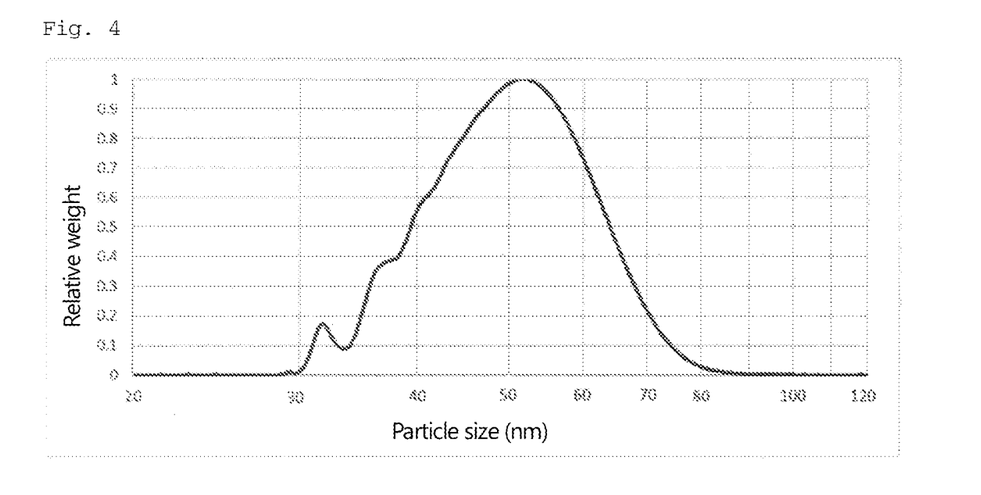
FIG. 4 is a graph showing the measurement results of the particle size distribution of the colloidal silica obtained in Example 2.

The particle size distribution of the colloidal silica obtained in Example 2 was measured in accordance with the following method. Specifically, colloidal silica was diluted with a 0.5 mass % aqueous sodium dodecyl sulfate solution so that the silica concentration was 2 mass % to prepare a diluted liquid. The prepared liquid was used to measure the particle size distribution of colloidal silica using a disc centrifuge ultra-high-resolution particle size analyzer (DC24000UHR, produced by CPS Instruments). The measurement was performed in a density gradient solution of 8% to 24% sucrose at a rotational speed of 18000 rpm, with the particle density of silica taken as 2.1. Table 2 and FIG. 4 show the measurement results of the particle size distribution.

TABLE 2

|  | Example 2 |
| --- | --- |
| 5% particle size | 67.6 nm |
| 10% particle size | 63.6 nm |
| 25% particle size | 57.2 nm |
| 50% particle size | 50.3 nm |
| 75% particle size | 43,6 nm |
| 90% partide size | 38.4 nm |
| 95% particle size | 35.8 nm |
| Peak position (half width) | 52.0 nm (24.7 nm), 31.7 nm (none) |
| Weight mean particle size (weight mean) | 508 nm |
| Number mean particle size (number mean) | 451 nm |
| Polydispetsity index (weight mean/number mean) | 1.127 |

For the colloidal silica obtained in Examples 2, 3, and 4, zeta potential measurement and XPS measurement were performed in accordance with the following methods.

Zeta Potential Measurement

The zeta potential of colloidal silica was measured with a measurement device that uses an ultrasonic attenuation method.

XPS Measurement

Colloidal silica was centrifuged at 5° C. at 77000 G for 90 minutes. The obtained precipitate was dried at 60° C. for 12 hours, and then ground with a mortar and a pestle, followed by drying under reduced pressure at 60° C. for 2 hours to prepare a dry powder.

The prepared dry powder was measured by XPS, and the peaks originating from the organic functional groups on the surface of particles were confirmed.

Figure 2:
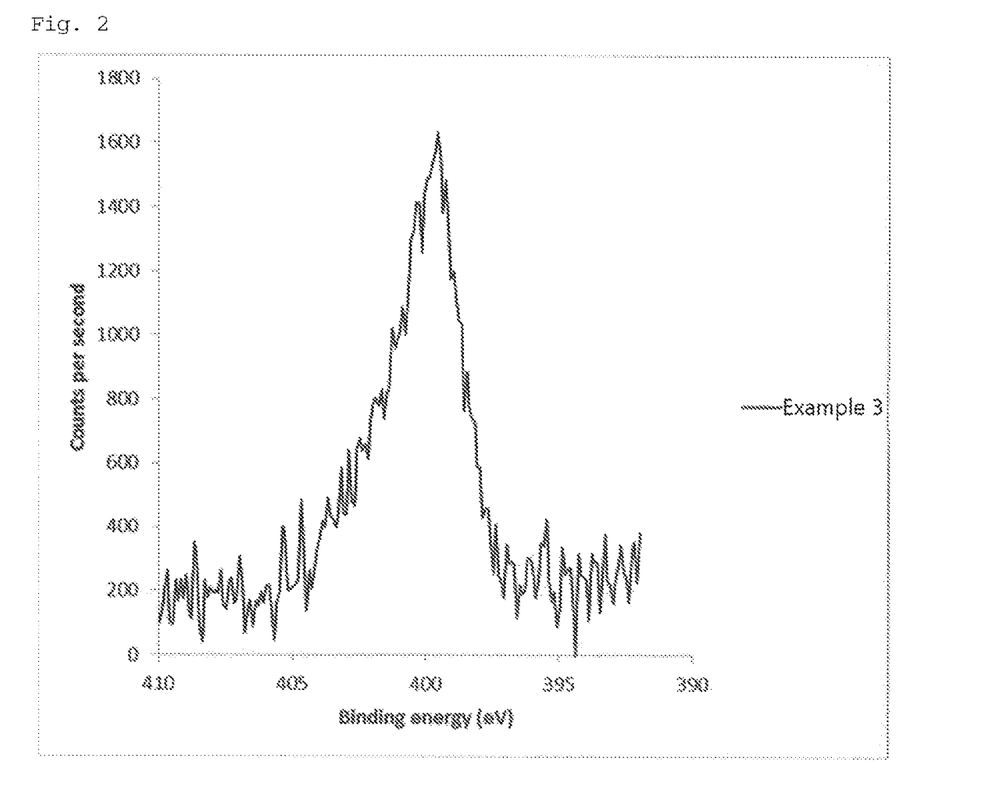
FIG. 2 is a graph showing XPS analysis results of the colloidal silica obtained in Example 3.
Figure 3:
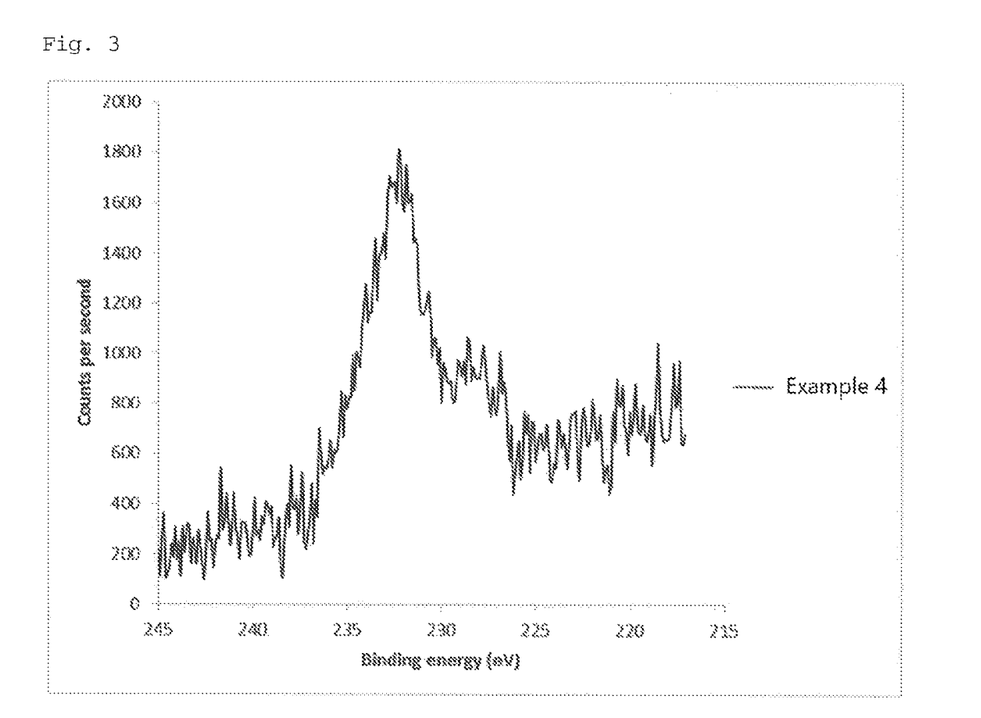
FIG. 3 is a graph showing XPS analysis results of the colloidal silica obtained in Example 4.

The measurement results of zeta potential of the colloidal silica obtained in Examples 2, 3, and 4 are shown in FIG. 1. The results of XPS analysis of the colloidal silica obtained in Example 3 are shown in FIG. 2. FIG. 2 is a graph showing the XPS spectrum of the 1s orbital of N atom constituting an amino group. The results of XPS analysis of the colloidal silica obtained in Example 4 are shown in FIG. 3. FIG. 3 is a graph showing the XPS spectrum of the 2s orbital of S atom constituting a sulfo group.

FIG. 1 shows that the zeta potential of the colloidal silica obtained in Example 3 was positively shifted with respect to the zeta potential of the colloidal silica obtained in Example 2. In particular, the isoelectric point of Example 3 was 5 or more. Further, the XPS measurement results shown in FIG. 2 confirmed that N atoms were detected, indicating that an amino group, which is a cationic functional group, was added to the surface of silica particles.

FIG. 1 also shows that the zeta potential of the colloidal silica obtained in Example 4 was negatively shifted with respect to the zeta potential of the colloidal silica obtained in Example 2. In particular, the zeta potential of Example 4 was negative in the entire pH range of 3 to 9. Further, the XPS measurement results shown in FIG. 3 confirmed that S atoms were detected, indicating that a sulfo group, which is an anionic functional group, was added to the surface of silica particles.

The invention claimed is:

1. A colloidal silica comprising silica particles having a bent structure and/or a branched structure,
   wherein
   the silica particles have a particle density of 1.95 or more,
   the silica particles have a ratio (m/n) of the content of alkoxy groups m (ppm) to the average primary particle size n (nm) of 200 or more, and
   the silica particles having a bent structure and/or a branched structure are present in an amount of 15% or more based on the number of particles in a given field of view as observed with a scanning electron microscope at 200,000-times magnification.

2. The colloidal silica according to claim 1, wherein the silica particles have a particle density of 1.95 or more and 2.20 or less.

3. The colloidal silica according to claim 1, wherein the silica particles contain 5 μmol or more of at least one amine selected from the group consisting of a primary amine, a secondary amine, and a tertiary amine, per gram of the silica particles, wherein the amine contains no hydroxyl group as a substituent.

4. The colloidal silica according to claim 1, wherein the silica particles have an organic functional group on the surface, the organic functional group being represented by the following formula (1)

wherein k represents an integer of 0 or more, and $R^5$ represents a functional group.

5. The colloidal silica according to claim 1, wherein the silica particles have an organic cationic functional group on the surface.

6. The colloidal silica according to claim 5, wherein the silica particles have an amino group on the surface.

7. The colloidal silica according to claim 1, wherein the silica particles have an organic anionic functional group on the surface.

8. The colloidal silica according to claim 7, wherein the silica particles have a sulfo group on the surface.

9. A method for producing colloidal silica, the method comprising in series
   (1) step 1 of preparing a mother liquor containing a first alkaline catalyst and water,
   (2) step 2 of adding an alkoxysilane to the mother liquor to prepare a mixed liquid, and
   (3) step 3 of adding a second alkaline catalyst to the mixed liquid to prepare a seed particle dispersion,
   wherein each of the first alkaline catalyst and the second alkaline catalyst is at least one amine selected from the group consisting of a primary amine, a secondary amine, and a tertiary amine
   wherein the amine contains no hydroxyl group as a substituent, and
   the molar ratio (s2/c3) of the amount of the alkoxysilane added s2 (mol) in step 2 to the amount of the second alkaline catalyst added c3 (mol) in step 3 is 185 or less.

10. The production method according to claim 9, comprising, after step 3, (4) step 4 of adding water and an alkoxysilane to the seed particle dispersion.

11. The production method according to claim 9, wherein the molar ratio (s2/c1) of the amount of the alkoxysilane added s2 (mol) in step 2 to the amount of the alkaline catalyst in the mother liquor c1 (mol) is 800 or more.

* * * * *